United States Patent
Massara et al.

(10) Patent No.: US 7,083,233 B2
(45) Date of Patent: Aug. 1, 2006

(54) ADJUSTABLE FLOATING PLATE LUMBER SUPPORT

(75) Inventors: Andrew J. Massara, Troy, MI (US); Brandon R. Vogt, Troy, MI (US)

(73) Assignee: Alfmeier Corporation, Greeneville, SC (US)

( * ) Notice: Subject to any disclaimer, the term of this patent is extended or adjusted under 35 U.S.C. 154(b) by 14 days.

(21) Appl. No.: 10/983,420

(22) Filed: Nov. 8, 2004

(65) Prior Publication Data

US 2006/0061168 A1    Mar. 23, 2006

(51) Int. Cl.
*A47C 31/00* (2006.01)
(52) U.S. Cl. .................. 297/284.4; 297/284.7
(58) Field of Classification Search ............. 297/284.4, 297/284.7
See application file for complete search history.

(56) References Cited

U.S. PATENT DOCUMENTS

| | | | | |
|---|---|---|---|---|
| 3,762,769 | A | * | 10/1973 | Poschl ...................... 297/284.4 |
| 4,124,252 | A | * | 11/1978 | Safir ...................... 297/452.55 |
| 4,295,681 | A | * | 10/1981 | Gregory .................. 297/284.4 |
| 4,339,150 | A | * | 7/1982 | McNamara et al. ..... 297/284.8 |
| 4,564,235 | A | | 1/1986 | Hatsutta et al. |
| 4,725,095 | A | | 2/1988 | Benson et al. |
| 5,449,219 | A | * | 9/1995 | Hay et al. ................. 297/284.4 |
| 5,505,520 | A | | 4/1996 | Frusti et al. |
| 5,649,739 | A | | 7/1997 | Zapf |
| 6,908,152 | B1 | * | 6/2005 | McMillen ................. 297/284.4 |
| 6,938,955 | B1 | * | 9/2005 | VanSickle ................ 297/284.4 |
| 2003/0111885 | A1 | | 6/2003 | McMillen |

FOREIGN PATENT DOCUMENTS

| | | |
|---|---|---|
| EP | 518830 A1 * | 12/1992 |
| EP | 0 582 821 A1 | 2/1994 |
| GB | 1 365 348 A | 9/1974 |

* cited by examiner

*Primary Examiner*—Peter M. Cuomo
*Assistant Examiner*—Sarah B. McPartlin
(74) *Attorney, Agent, or Firm*—Pitts & Brittian, P.C.

(57) ABSTRACT

An adjustable lumbar support (100) adapted to be easily integrated into new or existing seat structures. Adjustable lumbar support (100) includes a lower floating plate (115) that is adapted to have a second, or upper, plate (130) hinged relative to the lower plate (115). The upper and lower plates have independently actuated support linkages (120 and 140) that are selectively actuated by first and second actuating mechanisms. In this manner, selective actuation actuator mechanisms associated with the lower and upper support plates (115 and 130) provides adjustment of a vertical dimension of the adjustable floating plate lumbar support. The degree of support provided by floating plates (115 and 130) is adjusted by adjusting the effective length of the support linkages.

28 Claims, 5 Drawing Sheets

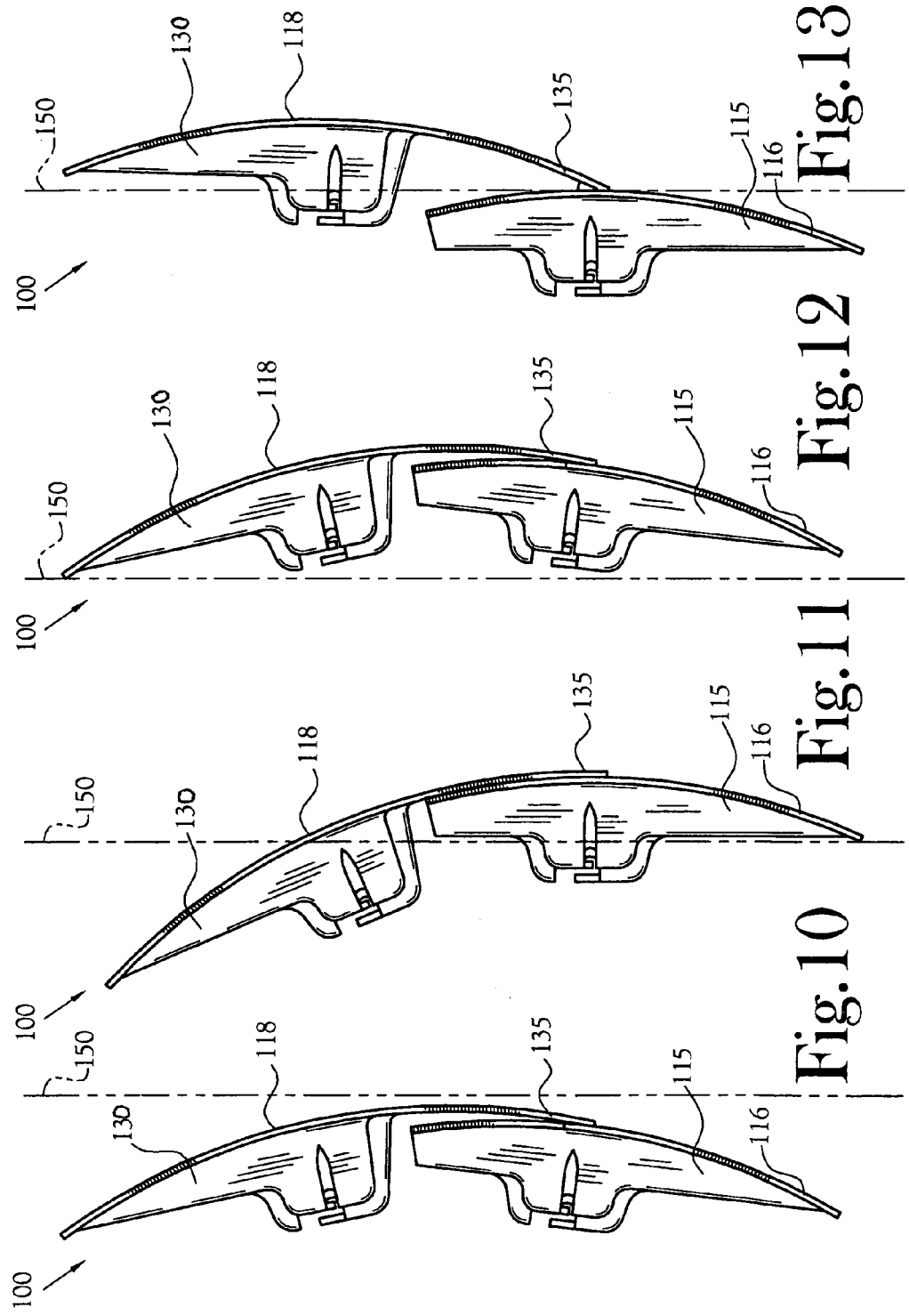

ADJUSTABLE FLOATING PLATE LUMBAR SUPPORT

CROSS-REFERENCE TO RELATED APPLICATIONS

This application claims the benefit of U.S. Provisional Application No. 60/378,854 filed May 8, 2002, PCT Application PCT/US02/022440 filed on Jul. 11, 2002 and to PCT Application PCT/US03/14258 filed on May 7, 2003.

STATEMENT REGARDING FEDERALLY SPONSORED RESEARCH OR DEVELOPMENT

Not Applicable

BACKGROUND OF THE INVENTION

1. Field of Invention

The present invention relates generally to seats, including vehicular seats. More particularly, the present invention relates to an adjustable lumbar support for a seat.

2. Description of the Related Art

It is well-recognized that a person sitting in a seat for an extended time period may desire additional support to obtain greater seat comfort and/or alleviate seat discomfort. Vehicle operators, vehicle passengers, and people whose jobs require them to be seated for extended periods of time are typically chief among those individuals who seek such additional support. The support is typically desired to provide greater comfort in the lower or the lumbar region of the back. As used herein, the term "seat" applies to a variety of seat structures, including chairs and vehicular seats.

The discomfort problem has been addressed in the prior art in several ways. A simple, although not complete, solution is to utilize a pillow placed low in the seat against the back thereof. By configuring the pillow into different shapes, a variation in lumbar support can be achieved. More permanent solutions to lumbar support problems have also been addressed, for example, in U.S. Pat. No. 5,076,643 issued to A. Colasanti, et al., on Dec. 31, 1993; and U.S. Pat. No. 5,190,348 issued to A. Colasanti on Mar. 2, 1993.

Both of the devices described in the '643 and '348 patents are of complex construction and require substantial time and cost for fabrication and installation. The requirements for the installation of a mounting plate, as well as the inter-securement of the bladder and plate elements, are primary reasons for the high cost, complexity of construction and the need of substantial time for the manufacture and installation of each device.

Other devices are also known in the art. Among these other devices are those disclosed in U.S. Pat. No. 4,567,615 issued to H. Fanti on Feb. 4, 1986, and U.S. Pat. No. 6,056,360, issued on May 2, 2000, to the predecessor in interest of the assignee of the present application, discloses a lumbar support system comprising unitary and divided leaf members. This device proved to be complicated and costly to manufacture. In addition to providing adjustment of the lumbar support in a horizontal direction, i.e. to increase or decrease the amount of support provided, it is also desirable to provide adjustment of the lumbar support in a vertical direction in order to provide lumbar support over a greater vertical dimension thereby accommodating a wide range of heights among seat occupants. However, the state of the art vertical adjustment merely raises or lowers the "bump" providing the support. What is desired is an adjustment that increases the vertical dimension of the support, thus providing for taller lumbar support, rather than merely increasing the height of the "bump" relative to the occupant's back.

BRIEF SUMMARY OF THE INVENTION

An adjustable lumbar support mechanism, constructed in accordance with the present invention, is provided which provides advantages over the prior art. The adjustable lumbar support can be easily integrated into a seat structure. The adjustable lumbar support includes a floating plate that "self centers" or "self aligns" offering firm yet compliant support and that "moves" with the occupant and is fully sprung, so as not to interfere with state of the art vibration insulation aspects of a seat, especially a vehicle seat. The floating support plate includes a curved front surface used to achieve lumbar support for a seat. The floating support plate is supported by a support linkage which includes first and second spring members that are engaged, either directly or indirectly, with the seat frame. The degree of lumbar support is adjusted by altering the effective length of the support linkage. A manual adjustment is provided for as well as a power adjustment. The powered embodiment is fully adaptable with "memory seating", wherein the memory function is provided by means of hall effect pulse, counting of motor rotations or simple potentiometer based sensors as is readily known to those skilled in the art.

In order to provide for vertical adjustment of the lumbar support, an alternate embodiment is provided in which the support plate defines a lower floating plate that is adapted to have a second, or upper, plate hinged relative to the lower plate. The upper and lower plates have independently actuated support linkages that operate in the manner described above. The upper and lower plates could be separate plates or could be integral. In this manner, selective actuation actuator mechanisms associated with the lower and upper support plates provides adjustment of a vertical dimension of the adjustable floating plate lumbar support.

BRIEF DESCRIPTION OF THE SEVERAL VIEWS OF THE DRAWINGS

The above-mentioned features of the invention will become more clearly understood from the following detailed description of the invention read together with the drawings in which:

FIG. 10 is a side view of the embodiment illustrated in FIG. 9 with certain elements removed for clarity of view showing the lower support plate and the upper support plate in the relaxed position.

FIG. 11 is a side view of the embodiment illustrated in FIG. 9 with certain elements removed for clarity of view showing the lower support plate in the fully actuated position and the upper support plate in the relaxed position.

FIG. 12 is a side view of the embodiment illustrated in FIG. 9 with certain elements removed for clarity of view both the lower support plate and the upper support plate in the fully actuated position.

FIG. 13 is a side view of the embodiment illustrated in FIG. 9 with certain elements removed for clarity of view the lower support plate in the relaxed position and the upper plate in the fully actuated position.

DETAILED DESCRIPTION OF THE INVENTION

Figure 1:
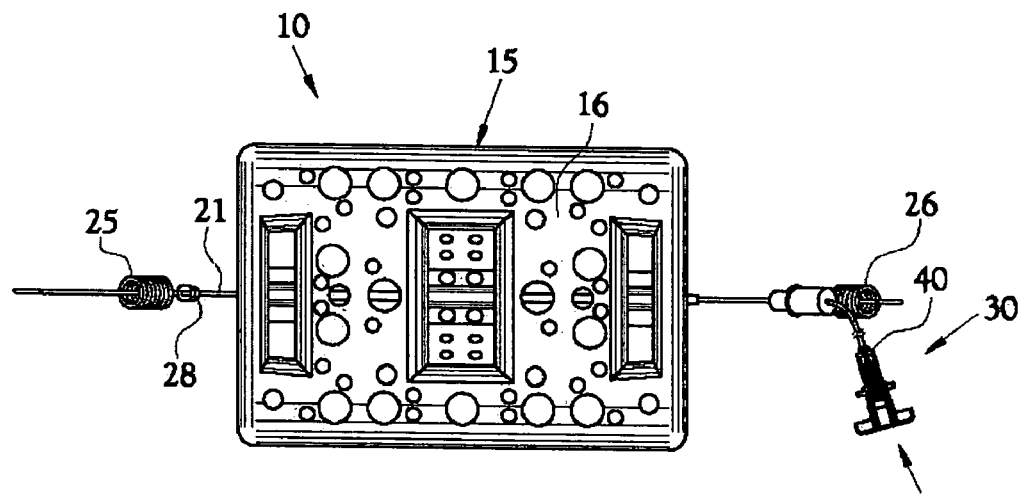
FIG. 1 is a front elevation view of the manually adjustable lumbar support mechanism of the present invention.

An adjustable lumbar support mechanism, constructed in accordance with the present invention, is illustrated generally as 10 in the figures. The adjustable lumbar support 10 provides a lumbar support mechanism which is adapted to be easily integrated into new or existing seat structures with minimal efforts and minimal costs. Moreover, in the preferred embodiment, the adjustable lumbar support 10 enables discrete regulation of the degree seat support provided to an individual's lumbar spine area and, thereby, maximizes the individual's comfort while occupying a seat. The lumbar support 10 includes a floating plate that "self centers" or "self aligns" offering firm yet compliant support and that "moves" with the occupant and is fully sprung, so as not to interfere with state of the art vibration insulation aspects of a seat, especially a vehicle seat.

FIGS. 1–4 illustrate one configuration of a floating support plate 15 having a curved front surface 16 used to achieve lumbar support for a seat. In this embodiment, the floating support plate 15 is supported by a support linkage. The support linkage is positioned with respect to the floating support plate 15 so as to support the floating support plate 15 in a pivotal manner. In this manner the floating support plate is self centering and self aligns itself with the occupant's back. In this embodiment, the support linkage is defined by a cable member 21 and first and second spring members 25 and 26 which engage, either directly or indirectly, the seat frame. In this regard, the cable member 21 includes a terminal end which is secured to first spring member 25. Second spring member 26 is adapted to allow passage of the cable member 21 through the spring member 26 to a mechanism, such as handle 30 adapted for adjusting the amount of support provided by the floating support plate 15. It will be appreciated that the cable member 21 slides in a flexible guide tube 22 which serves as a cable housing.

Figure 2:
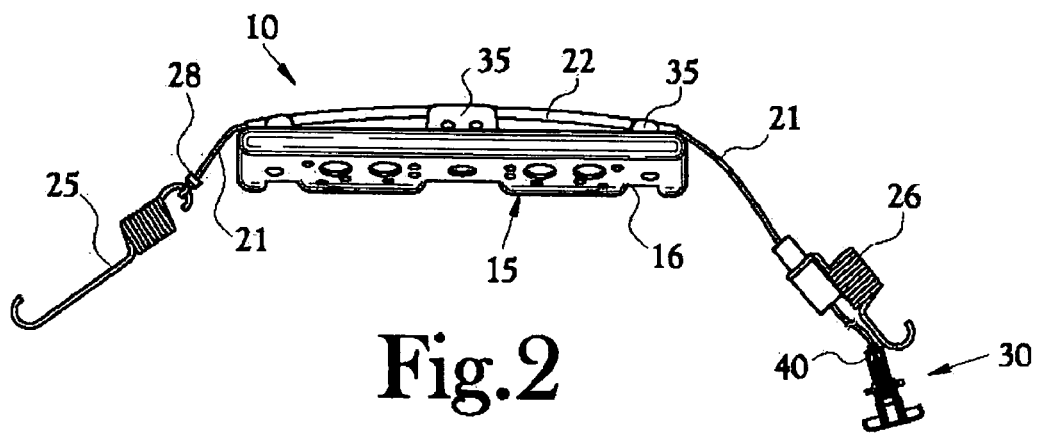
FIG. 2 is a top plan view of the manually adjustable lumbar support mechanism of the present invention showing the lumbar support mechanism in the retracted position, it being understood that the retracted position is the position that provides the least amount of lumbar support.
Figure 3:
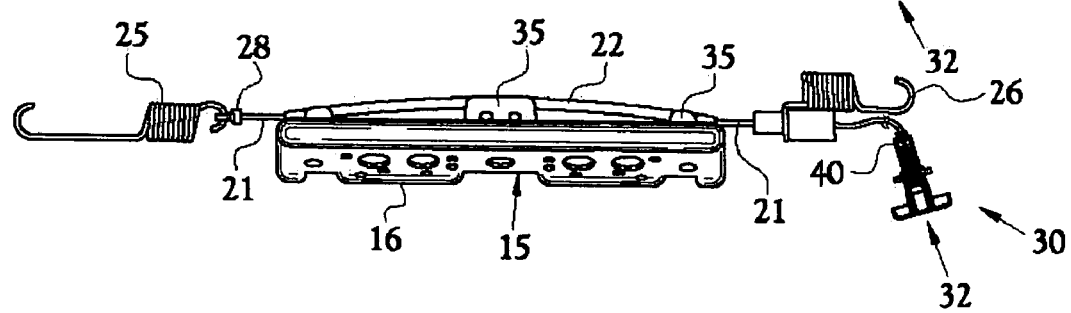
FIG. 3 is a top plan view of the manually adjustable lumbar support mechanism of the present invention showing the lumbar support mechanism in the extended position, it being understood that the extended position is the position that provides the greatest degree of lumbar support.
Figure 4:
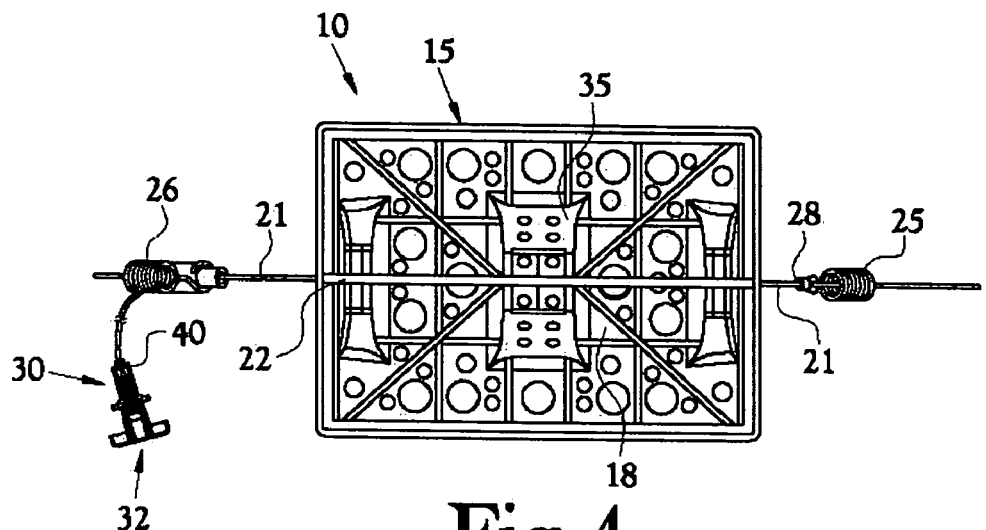
FIG. 4 is a rear elevation view of the manually adjustable lumbar support mechanism of the present invention.
Figure 5:
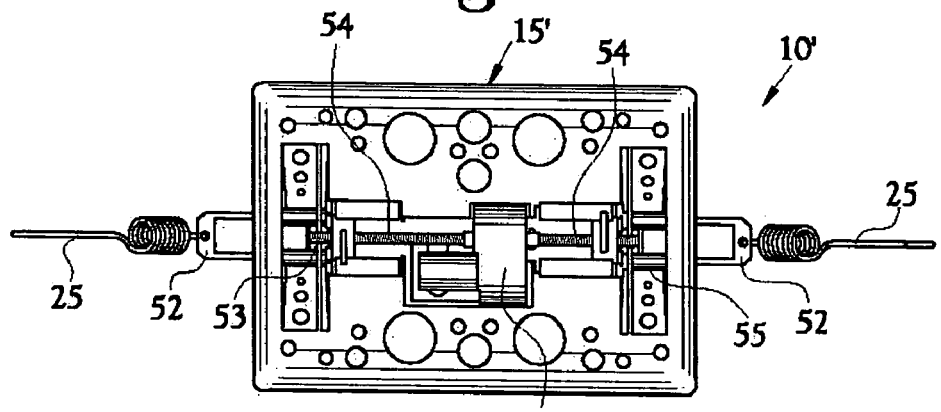
FIG. 5 is a front elevation view of an alternate embodiment of the adjustable lumbar support mechanism of the present invention which uses an electrically powered rotary mechanism for adjusting the lumbar support between the extended and retracted positions.
Figure 6:
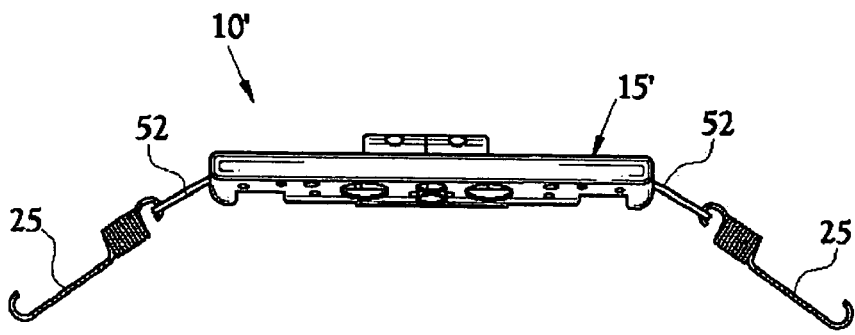
FIG. 6 is a top plan view of the electrically powered embodiment of the lumbar support mechanism of the present invention showing the lumbar support mechanism in the retracted position.

In this embodiment, the flexible guide tube 22 is secured to the rear surface 18 of the floating support plate 15. In the preferred embodiment, at least one projection 35 extends from the rear surface 18 of the floating support plate 15. The projection 35 preferably includes a groove 38 for receiving the flexible guide tube 22 in a manner that substantially secures the flexible guide tube 22 to the floating support plate 15. In this manner, the floating support plate 15 floats on the cable member 21 and the cable member 21 is allowed to slide freely through the flexible guide tube 22. Alternatively, a conduit for the cable member 21 could be integral with the floating support plate 15. The amount of lumbar support provided by the floating support plate 15 is determined by the effective length of the support linkage defined by the length of the cable member 21 disposed between the first and second spring members 25 and 26. In this regard, an actuator mechanism 30, adapted to apply and release force, is fixed to the cable member 21. For instance, a manual control actuator 32 could be utilized. In this regard, the actuator 32 receives the second end 40 of the cable member 21 such that rotation of the actuator 32 moves the cable member 21 within the flexible guide tube 22, either shortening or lengthening the effective length of the cable 21 between the first and second spring members 25 and 26. As can be seen in FIGS. 2 and 3, as the effective length of the cable member 21 between the first and second spring members 25 and 26 is shortened, the degree of lumbar support provided by the floating support plate 15 is increased. Other manual or motorized actuators are foreseeable, as well. For instance, the cable can be motor driven. Alternatively, a direct drive strap system could be utilized, thus eliminating the need for a remote driven cable.

Typically the floating support plate 15 is, preferably, fabricated from a material such as plastic or metal that rigid enough so as to resist significant flexion when loaded with pressure from a seated occupant. The floating support plate 15 could also be flexible to offer more resilient support. In this regard, the floating support plate 15 could be fabricated so as to be substantially flat when it is not loaded with pressure resulting from a seated occupant. In this example, the floating plate 15 is adapted so as to allow flexion about a horizontal chord so as to conform to the lumbar region of the occupant's back while simultaneously resisting flexion about a vertical chord. Of course, those skilled in the art will recognize that the curved support member could be fabricated from other rigid, preferably lightweight, materials, such as composites or metals. Also, while the figures illustrate a plurality of cutouts disposed in the upper curved surface 16 of the floating support plate 15, which are provided for weight reduction, it will be appreciated that the upper curved surface 16 could be substantially solid.

Figure 7:
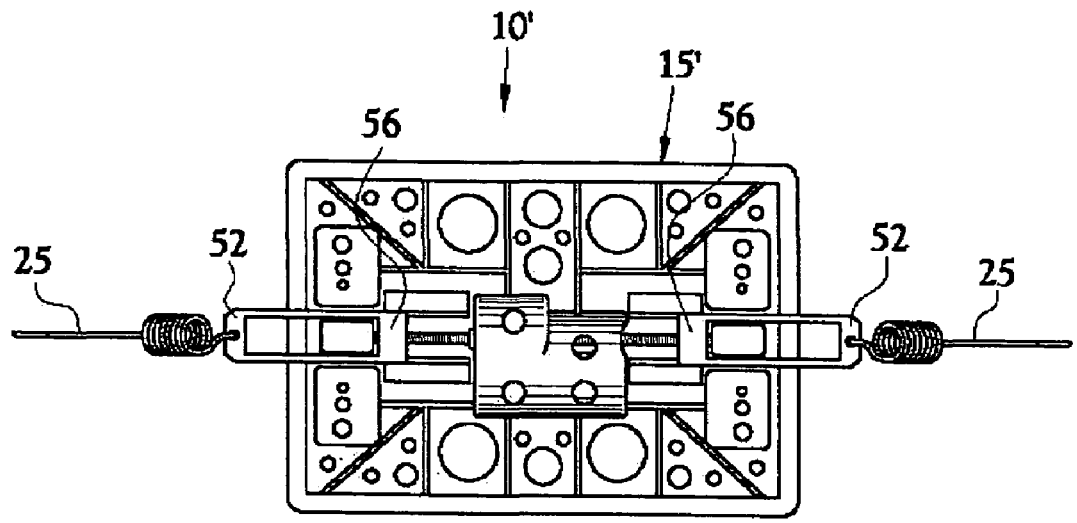
FIG. 7 is a rear elevation view of the electrically powered embodiment of the lumbar support mechanism of the present invention showing the lumbar support mechanism in the extended position.
Figure 8:
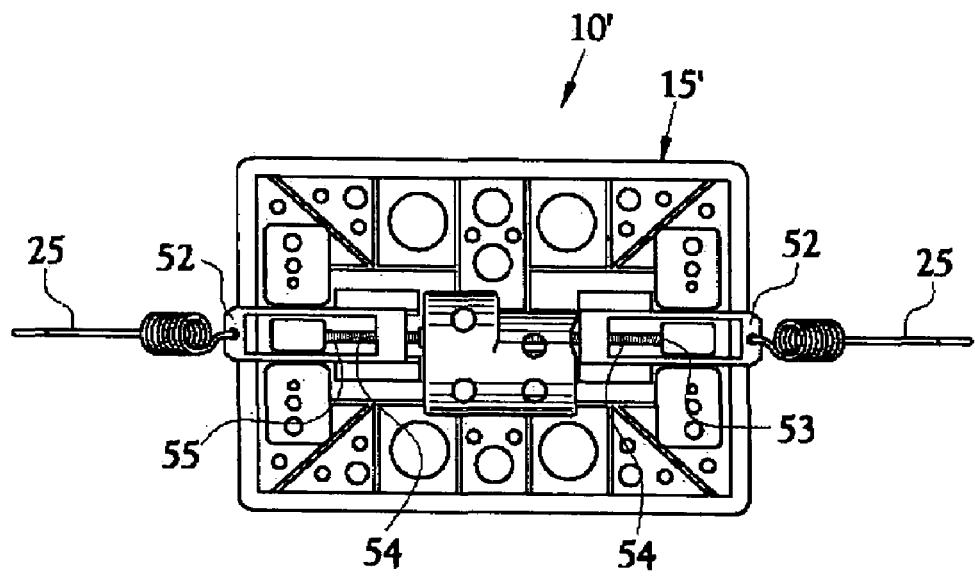
FIG. 8 is a rear elevation view of the electrically powered embodiment of the lumbar support mechanism of the present invention.
Figure 9:
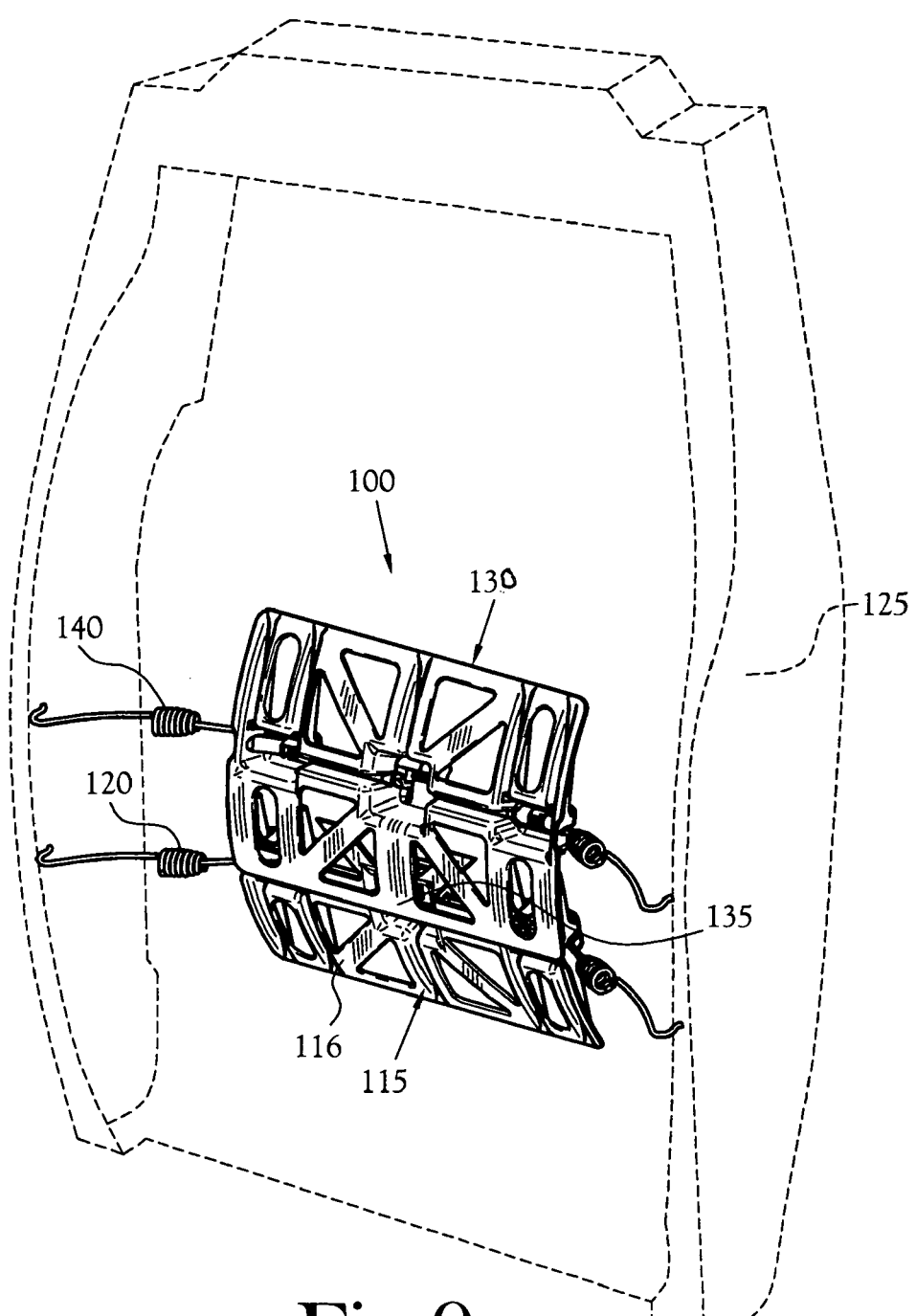
FIG. 9 is a perspective view of an additional embodiment adjustable floating plate lumbar support mechanism of the present invention.

FIGS. 5–8 illustrate another embodiment of the lumbar support mechanism 10' which includes floating support plate 15' which is actuated by an electrically powered rotary power mechanism 50. In this powered embodiment, the support linkage is defined by first and second spring members 25 engaged with first and second linkage members 52, respectively. The rotary power mechanism 50 applies rotating motion to a shaft 54 that is threaded on opposite ends 53, 55. One end is provided with a right hand thread and the other end is provided with a left hand thread. First and second linkage members 52 include threaded nuts 56 which engage the ends 53 and 55 of the shaft 54. Rotation of the shaft in a first direction will draw the first and second linkage members 52 inward, thus shortening the effective length of the support linkage as seen in FIG. 8. Contrariwise, rotation of the shaft 54 in the opposite direction will move the first and second linkage members 52, outward, thus lengthening the effective length of the support linkage as illustrated in FIG. 7. The rotary power mechanism 50 may require a shut-off switch depending upon the gear ratios and stall forces as will be readily recognized by those skilled in the art. It will be appreciated by those skilled in the art that both the manual embodiment and the powered embodiment are fully modular. Additionally, those skilled in the art will readily appreciate that the powered embodiment is fully adaptable with "memory seating", wherein the memory function is provided by means of hall effect pulse counting of motor rotations or simple potentiometer based sensors as is readily known to those skilled in the art.

In addition to the two-way adjustment of the curvature or amount of lumbar support described above, it is often desirable to provide for adjustment of the height of the lumbar support and to also provide for adjustment of the vertical dimension of the lumbar support. A second embodiment of the present invention provides for adjustment of the floating plate lumbar apparatus, both as to the height of the support and the vertical dimension of the support. In this regard, the adjustable lumbar support 100 includes a lower support plate 115 for providing support to a lumbar region of a seat and an upper support plate 130 which also provides support to a lumbar region of a seat and which allows adjustment of both the height of the lumbar support as well as increasing the overall vertical dimension of the lumbar support. Additionally, the upper support plate 130 has a lower edge 135 hingedly connected to the lower support plate 115. In one embodiment, the lower edge 135 is hingedly connected to the lower support plate 115 proximate a pivot line defined by the lower plate support linkage 120. It will be recognized that other points of attachment may also be desired in order to configure and modify the relative movement of the lower support plate 115 and the upper support plate 130. It should also be appreciated that the lower support plate 115 and the upper support plate 130 could be integral having a flexible region serving as a hinge line proximate the pivot line defined by the lower plate support linkage 120.

As described above with respect to the floating plate 15, lower support plate 115 and upper support plate 130 each have a front surface 116 and 118, respectively, and a rear surface. The lower support plate 115 and the upper support plate 130 can be similarly constructed and fabricated from the same types of materials as described above with respect to the floating plate 15.

The lower support plate 115 and the upper support plate 130 are suspended within a seat frame 125 by means of a lower plate support linkage 120 and an upper plate support linkage 140, respectively. As described above, the lower plate support linkage 120 is positioned with respect to the lower support plate 115 and the upper plate support linkage 140 is positioned with respect to the upper support plate 130 so as to support the lower support plate 115 and the upper support plate 130, respectively, in a pivotal manner. In this manner, it will be understood that the lower support plate 115 and the upper support plate 130, while hingedly connected one to the other, are independently suspended. And, are independently actuated as will be described below.

As described above with regard to the two way adjustable floating plate lumbar support, by changing the effective length of the lower plate support linkage 120 or the upper plate support linkage 140, the amount of lumbar support provided by either the lower support plate 115 or the upper support plate 130 is changed. To accomplish this, the lower plate support linkage 120 is acted upon by a first actuator mechanism and the upper plate support linkage 140 is acted upon by a second actuator mechanism. The first and second actuator mechanisms can be manually actuated, for example by use of a Bowden cable as described above or can be electrically driven as described above. In this regard, the various actuator mechanisms described above with respect to the two-way adjustable floating plate lumbar support could be utilized as the actuator mechanisms for the adjustable lumbar support 100. Indeed, it will be appreciated that the actuator mechanism for the lower plate support linkage 120 and the actuator mechanism for the upper plate support linkage 140 could both be manually adjustable or could both be electrically driven. Alternatively, one actuator mechanism could be electrically driven while the other actuator mechanism is electrically driven.

As seen in FIGS. 10–13, selective, and independent, actuation the actuator mechanisms for the lower plate support linkage and the upper plate support linkage provides adjustment of the height of the lumbar support as well as provides for adjustment of the vertical dimension of the lumbar support. In this regard, in FIG. 10, both the lower support plate 115 and the upper support plate 130 are shown in the fully relaxed position, relative to reference line 150. In this position, the adjustable lumbar support 100 can provide suspension and support to the back rest of the seat but do not provide discernable lumbar support. In FIG. 11, the lower support plate 115 has been fully extended relative to reference line 150, thus providing lumbar support, while the upper support plate 130 is still in the relaxed position. To increase the vertical dimension of the lumbar support, i.e. to increase the radius of the lumbar support, both the lower support plate 115 and the upper support plate 130 are fully extended, relative to reference line 150, as seen in FIG. 12. Finally, if one merely wants to change the height of the placement of the lumbar support, without increasing its overall vertical dimension, the lower support plate 115 can be maintained in the fully relaxed position and the upper plate is fully extended, relative to reference line 150, as illustrated in FIG. 13.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, we claim:

1. An adjustable floating plate lumbar support for seats, said adjustable floating plate lumbar support comprising:

a lower support plate for providing support to a lumbar region of a seat, said lower support plate having a front surface and a rear surface;

a lower plate support linkage for supporting said lower support plate, wherein said lower plate support linkage is adapted for engaging a seat frame, said lower plate support linkage having an effective length, said lower plate support linkage pivotally supporting said lower support plate;

an upper support plate for providing support to a lumbar region of a seat and for providing adjustment of a vertical dimension of said support to said lumbar region, said upper support plate having a front surface and a rear surface, said upper support plate having a lower edge hingedly connected to said lower support plate;

an upper plate support linkage for supporting said upper support plate, wherein said upper plate support linkage is adapted for engaging a seat frame, said upper plate support linkage having an effective length, said upper plate support linkage supporting said upper support plate in a pivotal manner;

a first actuator mechanism for adjusting said effective length of said lower plate support linkage, whereby a curvature of the lumbar support provided by said lower support plate is increased as said effective length of said support linkage is decreased; and a second actuator mechanism for adjusting said effective length of said upper plate support linkage, whereby a curvature of the lumbar support provided by said upper support plate is increased as said effective length of said upper plate support linkage is decreased;

whereby selective actuation said first and said second actuator mechanisms provides adjustment of a vertical dimension of said adjustable floating plate lumbar support.

2. The adjustable floating plate lumbar support of claim 1 wherein said lower and said upper support plates have a curved front surface.

3. The adjustable floating plate lumbar support of claim 1 wherein said upper support plate and said lower support plate are integral.

4. The adjustable floating plate lumbar support of claim 1 wherein said first and said second actuator mechanisms are manually activated.

5. The adjustable floating plate lumbar support of claim 1 wherein said first and said second actuator mechanisms are electrically powered.

6. The adjustable floating plate lumbar support of claim 5 wherein said first and said second actuator mechanisms apply rotating motion respectively to a first and a second shaft, each said shaft having first and second ends wherein said first and second ends are oppositely threaded.

7. The adjustable floating plate lumbar support of claim 1 wherein said lower and said upper support plates are constructed of a substantially rigid material such that said lower and said upper support plates do not flex when loaded by an occupant.

8. The adjustable floating plate lumbar support for seats of claim 1 wherein said lower plate support linkage is defined by first and second securement members engaged with first and second linkage members respectively, wherein said first and second securement members are adapted to further engage a seat frame and further wherein said first and second linkage members include threaded fasteners, wherein said first actuator mechanism is a powered mechanism for providing rotary motion to a shaft having first and second ends, said first and second ends of said shaft being oppositely threaded and said threaded fastener of said first linkage member being threadably engaged with said first end of said shaft and said threaded fastener of said second linkage member being threadably engaged with said second end of said shaft such that rotation of said shaft in a first direction draws said first and second linkage members inward thereby shortening said effective length of said lower plate support linkage, and rotation of said shaft in a second direction moves said first and second linkage members outward thereby increasing said effective length of said lower plate support linkage.

9. The adjustable floating plate lumbar support for seats of claim 8 wherein at least one of said first and said second securement members is defined by a spring.

10. The adjustable floating plate lumbar support for seats of claim 1 wherein said upper plate support linkage is defined by first and second securement members engaged with first and second linkage members respectively, wherein said first and second securement members are adapted to further engage a seat frame and further wherein said first and second linkage members include threaded fasteners, wherein said second actuator mechanism is a powered mechanism for providing rotary motion to a shaft having first and second ends, said first and second ends of said shaft being oppositely threaded and said threaded fastener of said first linkage member being threadably engaged with said first end of said shaft and said threaded fastener of said second linkage member being threadably engaged with said second end of said shaft such that rotation of said shaft in a first direction draws said first and second linkage members inward thereby shortening said effective length of said upper plate support linkage, and rotation of said shaft in a second direction moves said first and second linkage members outward thereby increasing said effective length of said upper plate support linkage.

11. The adjustable floating plate lumbar support for seats of claim 10 wherein at least one of said first and said second securement members is defined by a spring.

12. The adjustable floating plate lumbar support for seats of claim 8 wherein said upper plate support linkage is defined by first and second securement members engaged with first and second linkage members respectively, wherein said first and second securement members are adapted to further engage a seat frame and further wherein said first and second linkage members include threaded fasteners, wherein said second actuator mechanism is a powered mechanism for providing rotary motion to a shaft having first and second ends, said first and second ends of said shaft being oppositely threaded and said threaded fastener of said first linkage member being threadably engaged with said first end of said shaft and said threaded fastener of said second linkage member being threadably engaged with said second end of said shaft such that rotation of said shaft in a first direction draws said first and second linkage members inward thereby shortening said effective length of said upper plate support linkage, and rotation of said shaft in a second direction moves said first and second linkage members outward thereby increasing said effective length of said upper plate support linkage.

13. The adjustable floating plate lumbar support of claim 1 wherein said upper support plate is hingedly connected to said lower support plate proximate a pivot line defined by said lower plate support linkage.

14. An adjustable floating plate lumbar support for seats, said adjustable floating plate lumbar support comprising:

a lower support plate for providing support to a lumbar region of a seat, said lower support plate having a front surface and a rear surface;

a lower plate support linkage for supporting said lower support plate, wherein said lower plate support linkage is adapted for engaging a seat frame, said lower plate support linkage having an effective length and including at least one spring member disposed between said lower support plate and the seat frame, said lower plate support linkage pivotally supporting said lower support plate, wherein said lower plate support linkage is defined by first and second securement members engaged with first and second linkage members respectively, wherein said first and second securement members are adapted to further engage a seat frame and further wherein said first and second linkage members include threaded fasteners;

an upper support plate for providing support to a lumbar region of a seat and for providing adjustment of a vertical dimension of said support to said lumbar region, said upper support plate having a front surface and a rear surface, said upper support plate having a lower edge hingedly connected to said lower support plate;

an upper plate support linkage for supporting said upper support plate, wherein said upper plate support linkage is adapted for engaging a seat frame, said upper plate support linkage having an effective length and including at least one spring member disposed between said upper support plate and the seat frame, said upper plate support linkage supporting said upper support plate in a pivotal manner;

a first actuator mechanism for adjusting said effective length of said lower plate support linkage, whereby a curvature of the lumbar support provided by said lower support plate is increased as said effective length of said support linkage is decreased, wherein said first actuator mechanism is a powered mechanism for providing rotary motion to a shaft having first and second ends, said first and second ends of said shaft being oppositely threaded and said threaded fastener of said first linkage member being threadably engaged with said first end of said shaft and said threaded fastener of said second linkage member being threadably engaged with said second end of said shaft such that rotation of said shaft in a first direction draws said first and second linkage members inward thereby shortening said effective length of said lower plate support linkage, and rotation of said shaft in a second direction moves said first and second linkage members outward thereby increasing said effective length of said lower plate support linkage; and a second actuator mechanism for adjusting said effective length of said upper plate support linkage, whereby a curvature of the lumbar support provided by said upper support plate is increased as said effective length of said upper plate support linkage is decreased;

whereby selective actuation said first and said second actuator mechanisms provides adjustment of a vertical dimension of said adjustable floating plate lumbar support.

15. The adjustable floating plate lumbar support of claim 14 wherein said lower and said upper floating support plates have a curved front surface.

16. The adjustable floating plate lumbar support of claim 14 wherein said upper support plate and said lower support plate are integral.

17. The adjustable floating plate lumbar support of claim 14 wherein said second actuator mechanism is manually activated.

18. The adjustable floating plate lumbar support of claim 14 wherein said second actuator mechanism is electrically powered.

19. The adjustable floating plate lumbar support of claim 14 wherein said upper support plate is hingedly connected to said lower support plate proximate a pivot line defined by said lower plate support linkage.

20. The adjustable floating plate lumbar support of claim 14 wherein said floating support plate is constructed of a substantially rigid material such that said lower and said upper support plates do not flex when loaded by an occupant.

21. The adjustable floating plate lumbar support for seats of claim 14 wherein said upper plate support linkage is defined by first and second securement members engaged with first and second linkage members respectively, wherein said first and second securement members are adapted to further engage a seat frame and further wherein said first and second linkage members include threaded fasteners, wherein said second actuator mechanism is a powered mechanism for providing rotary motion to a shaft having first and second ends, said first and second ends of said shaft being oppositely threaded and said threaded fastener of said first linkage member being threadably engaged with said first end of said shaft and said threaded fastener of said second linkage member being threadably engaged with said second end of said shaft such that rotation of said shaft in a first direction draws said first and second linkage members inward thereby shortening said effective length of said upper plate support linkage, and rotation of said shaft in a second direction moves said first and second linkage members outward thereby increasing said effective length of said upper plate support linkage.

22. An adjustable floating plate lumbar support for seats, said adjustable floating plate lumbar support comprising:

a lower support plate for providing support to a lumbar region of a seat, said lower support plate having a front surface and a rear surface;

a lower plate support linkage for supporting said lower support plate, wherein said lower plate support linkage is adapted for engaging a seat frame, said lower plate support linkage having an effective length and including at least one spring member disposed between said lower support plate and the seat frame, said lower plate support linkage pivotally supporting said lower support plate;

an upper support plate for providing support to a lumbar region of a seat and for providing adjustment of a vertical dimension of said support to said lumbar region, said upper support plate having a front surface and a rear surface, said upper support plate having a lower edge hingedly connected to said lower support plate;

an upper plate support linkage for supporting said upper support plate, wherein said upper plate support linkage is adapted for engaging a seat frame, said upper plate support linkage having an effective length and including at least one spring member disposed between said upper support plate and the seat frame, said upper plate support linkage supporting said upper support plate in a pivotal manner, wherein said upper plate support linkage is defined by first and second securement members engaged with first and second linkage members respectively, wherein said first and second securement members are adapted to further engage a seat frame and further wherein said first and second linkage members include threaded fasteners;

a first actuator mechanism for adjusting said effective length of said lower plate support linkage, whereby a curvature of the lumbar support provided by said lower support plate is increased as said effective length of said support linkage is decreased; and a second actuator mechanism for adjusting said effective length of said upper plate support linkage, whereby a curvature of the lumbar support provided by said upper support plate is increased as said effective length of said upper plate support linkage is decreased, wherein said second actuator mechanism is a powered mechanism for providing rotary motion to a shaft having first and second ends, said first and second ends of said shaft being oppositely threaded and said threaded fastener of said first linkage member being threadably engaged with said first end of said shaft and said threaded fastener of said second linkage member being threadably engaged with said second end of said shaft such that rotation of said shaft in a first direction draws said first and second linkage members inward thereby shortening said effective length of said upper plate support linkage, and rotation of said shaft in a second direction moves said first and second linkage members outward thereby increasing said-effective length of said upper plate support linkage;

whereby selective actuation said first and said second actuator mechanisms provides adjustment of a vertical dimension of said adjustable floating plate lumbar support.

23. The adjustable floating plate lumbar support for seats of claim 22 wherein said lower plate support linkage is defined by first and second securement members engaged with first and second linkage members respectively, wherein said first and second securement members are adapted to further engage a seat frame and further wherein said first and second linkage members include threaded fasteners, wherein said first actuator mechanism is a powered mechanism for providing rotary motion to a shaft having first and second ends, said first and second ends of said shaft being oppositely threaded and said threaded fastener of said first linkage member being threadably engaged with said first end of said shaft and said threaded fastener of said second linkage member being threadably engaged with said second end of said shaft such that rotation of said shaft in a first direction draws said first and second linkage members inward thereby shortening said effective length of said lower plate support linkage, and rotation of said shaft in a second direction moves said first and second linkage members outward thereby increasing said effective length of said lower plate support linkage.

24. The adjustable floating plate lumbar support of claim 22 wherein said upper support plate is hingedly connected to said lower support plate proximate a pivot line defined by said lower plate support linkage.

25. The adjustable floating plate lumbar support of claim 22 wherein said upper support plate and said lower support plate are integral.

26. The adjustable floating plate lumbar support of claim 22 wherein said lower and said upper floating support plates have a curved front surface.

27. The adjustable floating plate lumbar support of claim 22 wherein said first actuator mechanism is manually activated.

28. The adjustable floating plate lumbar support of claim 22 wherein said first actuator mechanism is electrically powered.

* * * * *